(12) United States Patent
Zou et al.

(10) Patent No.: US 10,705,936 B2
(45) Date of Patent: Jul. 7, 2020

(54) DETECTING AND HANDLING ERRORS IN A BUS STRUCTURE

(71) Applicant: EMC Corporation, Hopkinton, MA (US)

(72) Inventors: Colin Yong Zou, Beijing (CN); Man Lv, Beijing (CN); Wenbo Wang, Beijing (CN); Long Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 15/097,598

(22) Filed: Apr. 13, 2016

(65) Prior Publication Data

US 2016/0306722 A1 Oct. 20, 2016

(30) Foreign Application Priority Data

Apr. 16, 2015 (CN) .......................... 2015 1 01818820

(51) Int. Cl.
*G06F 11/00* (2006.01)
*G06F 11/30* (2006.01)
(Continued)

(52) U.S. Cl.
CPC ...... *G06F 11/3027* (2013.01); *G06F 11/2028* (2013.01); *G06F 11/3409* (2013.01); *G06F 2201/81* (2013.01)

(58) Field of Classification Search
CPC ............. G06F 11/3027; G06F 11/3409; G06F 11/3031; G06F 11/3055; G06F 11/2023
See application file for complete search history.

(56) References Cited

U.S. PATENT DOCUMENTS

| 5,542,076 A | * | 7/1996 | Benson ................. | G06F 9/4812 710/260 |
| 6,580,898 B1 | * | 6/2003 | Oguri ..................... | G06F 11/20 455/423 |

(Continued)

FOREIGN PATENT DOCUMENTS

| CN | 101000568 A | 7/2007 |
| CN | 103415840 A | 11/2013 |

OTHER PUBLICATIONS

"HP Auto Port Aggregation Administrators Guide, HP-UX 11i v3" Jan. 2010.*

(Continued)

*Primary Examiner* — Philip Guyton
(74) *Attorney, Agent, or Firm* — Brian J. Colandreo; Mark H. Whittenberger; Holland & Knight LLP

(57) ABSTRACT

Embodiments of the present disclosure provide a system, a computer program product and a method for detecting and handling errors in a bus structure by obtaining error information from a plurality of hardware registers associated with a bus; in response to determining that a number of the errors in one or more hardware registers of the plurality of hardware registers exceeds a predetermined threshold, detecting performance of hardware devices corresponding to the one or more hardware registers; and in response to determining performance deterioration of one hardware device in the hardware devices corresponding to the one or more hardware registers, determining that an error occurs in the hardware device.

12 Claims, 4 Drawing Sheets

(51) Int. Cl.
*G06F 11/34* (2006.01)
*G06F 11/20* (2006.01)

(56) References Cited

U.S. PATENT DOCUMENTS

| | | | | |
|---|---|---|---|---|
| 2002/0184576 | A1* | 12/2002 | Arndt | G06F 11/323 |
| | | | | 714/47.2 |
| 2002/0194548 | A1* | 12/2002 | Tetreault | G06F 11/0736 |
| | | | | 714/43 |
| 2004/0153866 | A1* | 8/2004 | Guimbellot | H04L 1/22 |
| | | | | 714/4.11 |
| 2004/0210800 | A1* | 10/2004 | Ghislain Gabriel Vecoven | G06F 11/0712 |
| | | | | 714/4.2 |
| 2007/0043975 | A1* | 2/2007 | Varadarajan | G06F 11/1438 |
| | | | | 714/25 |
| 2007/0078976 | A1* | 4/2007 | Taylor | G03G 15/5075 |
| | | | | 709/224 |
| 2015/0370683 | A1* | 12/2015 | Nishiyama | G06F 13/4282 |
| | | | | 714/43 |

OTHER PUBLICATIONS

Chinese Office Action issued in CN Application Serial No. 2015101818820 dated Apr. 18, 2019.

\* cited by examiner

DETECTING AND HANDLING ERRORS IN A BUS STRUCTURE

RELATED APPLICATION

This application claim priority from Chinese Patent Application Number CN2015101818820, filed at the State Intellectual Property Office, China, titled "METHOD AND SYSTEM FOR DETECTING AND HANDLING ERRORS IN A BUS STRUCTURE," the contents of which is herein incorporated by reference in entirety.

FIELD OF THE INVENTION

Embodiments of the present disclosure relate to the field of bus technology.

BACKGROUND OF THE INVENTION

In general, a bus may be a communication trunk for connecting respective components in a computer system. Typically, in architectures that may have components interconnected via a bus, if an error occurs, it would always be hard to determine a specific location of the error, e.g., to determine whether it is an error of the bus per se or an error of a connected component; and besides, it may be hard to recover from such bus error.

In general, existing solution to solve such errors mainly relies on manual analysis from an engineer. For example, it may be likely required that an engineer analyzes all possibly relevant logs manually, and attempts to classify error items by replacing some hardware devices therein. Generally, since a flow of such manual solutions generally requires a client to observe a service deterioration problem for several hours or even days and file a service request; after which. an engineer may be required to start viewing/analyzing logs by accessing a machine to check the problem; and finally, it may be required to physically replace a hardware device so as to classify/repair the problem. This may lead to a long-term service deterioration, which may be time-consuming, also laborious, and highly dependent on an engineer's skill level. As a consequence, the result may vary to a large extent and may be rather instable in a large number of cases.

SUMMARY

Example embodiments of the disclosure provide a computer program product, a system and a method for detecting and handling errors in a bus structure by obtaining error information from a plurality of hardware registers associated with a bus; in response to determining that a given number of errors obtained from the error information in one or more hardware registers of the plurality of hardware registers exceeds a predetermined threshold, detecting a performance deterioration/issue (for example a glitch or drawback) of hardware devices corresponding to the one or more hardware registers; and in response to determining the performance deterioration of a particular hardware device in the hardware devices corresponding to the one or more hardware registers, resolving that an error occurs in the particular hardware device.

BRIEF DESCRIPTION OF THE DRAWINGS

The above and other objectives, features, and advantages of the present disclosure will become more apparent through more detailed description of the exemplary embodiments of the present disclosure in conjunction with the accompanying drawings, wherein in the exemplary embodiments of the present disclosure, like reference numerals generally represent the same components.

DETAILED DESCRIPTION OF THE PREFERRED EMBODIMENTS

Figure 1:
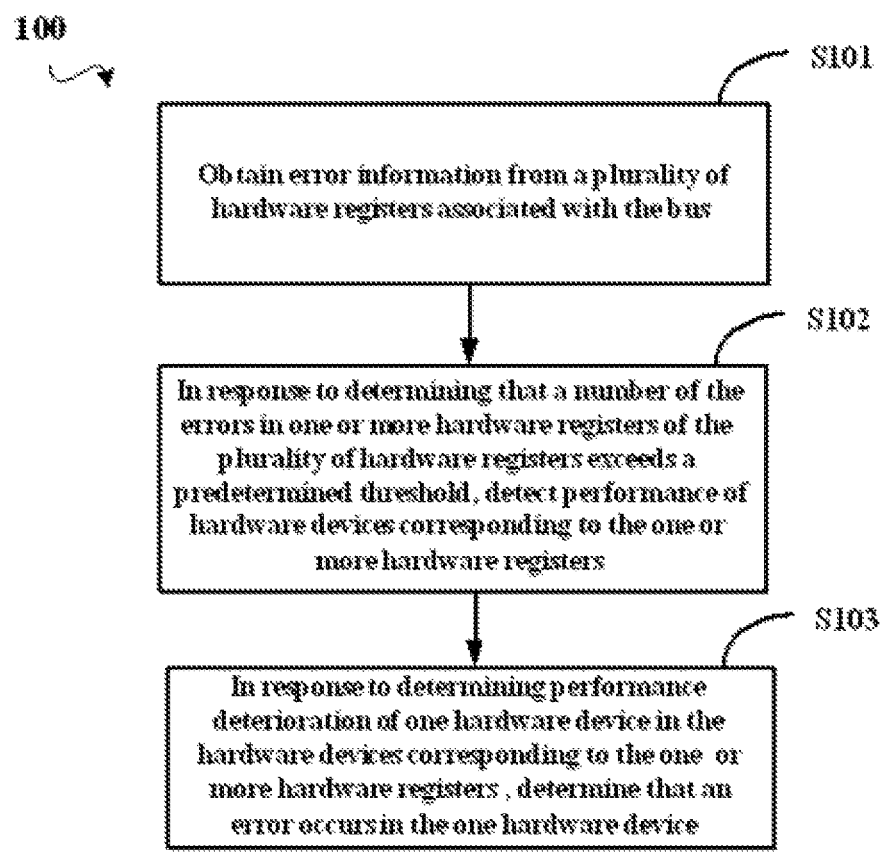
FIG. 1 illustrates a flow diagram of a method 100 for detecting and handling errors in a bus structure according to an exemplary embodiment of the present disclosure.

Hereinafter, preferred embodiments of the disclosure will be described in more detail with reference to the accompanying drawings. Although the preferred embodiments of the disclosure are illustrated in the drawings, it should be understood that the disclosure may be implemented in various manners, not limited by the embodiments illustrated here. On the contrary, these embodiments are provided to make the disclosure more thorough and complete and to enable the scope of the disclosure to be completely conveyed to those skilled in the art.

It may be noted that the flowcharts and block diagrams in the figures may illustrate the apparatus (system), method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

Generally speaking, all terms used herein should be understood according to their general meanings in the art unless otherwise explicitly stated. All mentioned "a/an/the/said element, device, component, apparatus, unit, step, etc." should be construed as at least one instance of the above element, device, component, apparatus, unit, step, etc., and it is not excluded to comprise a plurality of such elements, devices, components, apparatuses, units, steps, etc., unless otherwise explicitly stated.

Example embodiments of the disclosure provide a computer program product, a system and a method for detecting and handling errors in a bus structure by obtaining error information from a plurality of hardware registers associated with a bus; in response to determining that a given number of errors obtained from the error information in one or more hardware registers of the plurality of hardware registers exceeds a predetermined threshold, detecting a performance deterioration/issue (for example a glitch or drawback) of hardware devices corresponding to the one or more hardware registers; and in response to determining the performance deterioration of a particular hardware device in the hardware devices corresponding to the one or more hardware registers, resolving that an error occurs in the particular hardware device.

A further embodiment may include determining whether a backup device exists for a hardware device; and in response to detecting an existence of a backup device, performing failover on a hardware device using the backup device. A further embodiment may include resetting a hardware device. A further embodiment may include after resetting a hardware device, deciding whether to switch back to a hardware device from a backup device at least partially based on an error recovery history of the hardware device.

In a further embodiment obtaining error information from a plurality of hardware registers associated with a bus may include periodically polling a plurality of hardware registers so as to obtain error information. In a further embodiment periodicity for polling the plurality of hardware registers may be dynamically adjusted based on a given number of the errors.

In a further embodiment obtaining error information from a plurality of hardware registers associated with a bus may include monitoring an interrupt message reporting error information from hardware registers, so as to obtain an error from the error information.

In a further embodiment when a given number of errors are greater than a predetermined threshold, an interrupt message may be disabled; and error information may be obtained by periodically polling a plurality of hardware registers.

In a further embodiment, performance of hardware devices corresponding to the one or more hardware registers may be detected by a performance detector. In a further embodiment, a performance detector may be set based on types of hardware devices corresponding to a plurality of hardware registers. In an alternative embodiment, a bus may include a PCIe bus.

In one embodiment, there is provided a system for detecting and handling errors in a bus structure. In a further embodiment the system may include an error obtaining unit that may be configured to obtain error information from a plurality of hardware registers associated with a bus. In a further embodiment the system may include a performance detecting unit that may be configured to, in response to determining that a given number of errors in one or more hardware registers of a plurality of hardware registers exceeds a predetermined threshold, detect a performance issue of hardware devices corresponding to the one or more hardware registers. In a further embodiment the system may include an error determining unit that may be configured to, in response to determining performance deterioration/issue of a particular hardware device in the hardware devices corresponding to the one or more hardware registers, determine that an error occurs in the particular hardware device.

In a further embodiment the system may include a backup device determining unit that may be configured to determine whether a backup device exists for the particular hardware device. In a further embodiment the system may include a failover unit that may be configured to, in response to the existence of a backup device, perform failover on the particular hardware device using the backup device. In a further embodiment the system may include a resetting unit that may be configured to reset the particular/identified hardware device. In a further embodiment the system may include a failover unit that may be configured to, after resetting a particular hardware device, decide whether to switch back to the particular hardware device from a backup device at least partially based on an error recovery history of the particular hardware device.

In a further embodiment obtaining error information from a plurality of hardware registers associated with a bus may include periodically polling a plurality of hardware registers so as to obtain error information. In a further embodiment, periodicity for polling a plurality of hardware registers may be dynamically adjusted based on a given number of errors.

In a further embodiment, obtaining error information from a plurality of hardware registers associated with a bus may include monitoring an interrupt message reporting error information from hardware registers, so as to obtain error information. In a further embodiment, when a given number of errors are greater than a predetermined threshold, the interrupt message may be disabled; and the error information may be obtained by periodically polling a plurality of hardware registers.

In a further embodiment, performance of hardware devices corresponding to the one or more hardware registers may be detected by a performance detector, the performance detector may be set based on types of hardware devices corresponding to a plurality of hardware registers. In a further embodiment, a bus may include a PCIe bus.

Reference is now made to FIG. 1, which shows a flow diagram of a method 100 for detecting and handling errors in a bus structure according to an exemplary embodiment of the present disclosure. For convenience of illustration, a current common PCIe bus is mainly used as an example hereinafter. However, those skilled in the art should understand that the concept disclosed herein may also be applicable to other types of buses such as PCI, and the present disclosure should not be construed as a limitation.

As shown in FIG. 1, after method 100 starts, it first proceeds to step S101, where error information is obtained from a plurality of hardware registers associated with a bus. In addition, in an exemplary embodiment of the present disclosure, step S101 may be executed by starting a specific monitoring module or daemon. Next, in step S102, where in response to determining that a given number of the errors in one or more hardware registers in a plurality of hardware registers exceeds a predetermined threshold, performance related issues of hardware devices corresponding to the one or more hardware registers is detected. Next, in step S103, where in response to determining performance deterioration of a particular hardware device in the hardware devices corresponding to the one or more hardware registers, it is determined that an error occurs in the a particular hardware device. According to an alternative embodiment, this error may be reported to a monitoring module, and the monitoring module may associate this performance event with the detected hardware register error, and records the error in a log. Through steps S101-S103, method 100 enables automatic detection of errors occurring in a bus structure, which, on one hand, saves costs, and on the other hand, enhances the error detection efficiency.

In one embodiment, a plurality of hardware registers associated with a bus may include registers associated with each bus device in a bus structure. In an example embodiment, in case considering a bus as a PCIe bus, the bus may include a PCIe root port, a switch, an endpoint device, etc. In a further embodiment, a manner of obtaining error information at least includes two methods, i.e., polling and interrupting. In a specific example embodiment, error information may be obtained by periodically polling a plurality of hardware registers. In another specific example embodiment, the error information may be obtained by monitoring an interrupt message reporting error information from hardware registers. In a further embodiment, those skilled in the art should understand that other manners/means of obtaining possible error information may be possible and all such means fall within the scope of the present disclosure.

In a further embodiment, in case of obtaining error information by polling a hardware register may include a policy of polling may be user-configurable. In an example embodiment, a periodicity for polling may be dynamically adjusted based on a number of errors. In an example embodiment, initially, polling may be performed with a longer periodicity; without detecting error information in a register, a long polling periodicity may be maintained unchanged; while in case of detecting any error information in any hardware register, a polling periodicity may be shortened (e.g., to half of the original polling periodicity.) In a further embodiment, if errors are constantly detected, a polling periodicity may be set increasingly shorter until a predetermined threshold may be reached. In an alternate embodiment, when no more error information is detected, a polling periodicity may be enlarged gradually, till the periodicity reaches back to an initial large polling periodicity. In a further embodiment, a specific threshold and polling periodicity may be optionally set by a user. In an alternative embodiment, a polling periodicity may be adjusted only to a hardware register with error information being detected, so as to seek a balance between error detection accuracy and system resource utilization.

In a further embodiment, considering a scenario of reporting error information through an interrupt message, when a number of errors is greater than a predetermined threshold, an interrupt message may be disabled; and moreover, error information may be obtained by periodically polling a plurality of hardware registers. In a further embodiment, system performance may be affected significantly when a number of errors is large (greater than a predetermined threshold.) In a further embodiment, in order to reduce extra overheads brought by an interrupt message to a system, the interrupt message may be disabled and alternatively a polling approach may be used to obtain an error message. In an additional embodiment, step S101 may be executed by starting a specific monitoring module or daemon.

Figure 2:
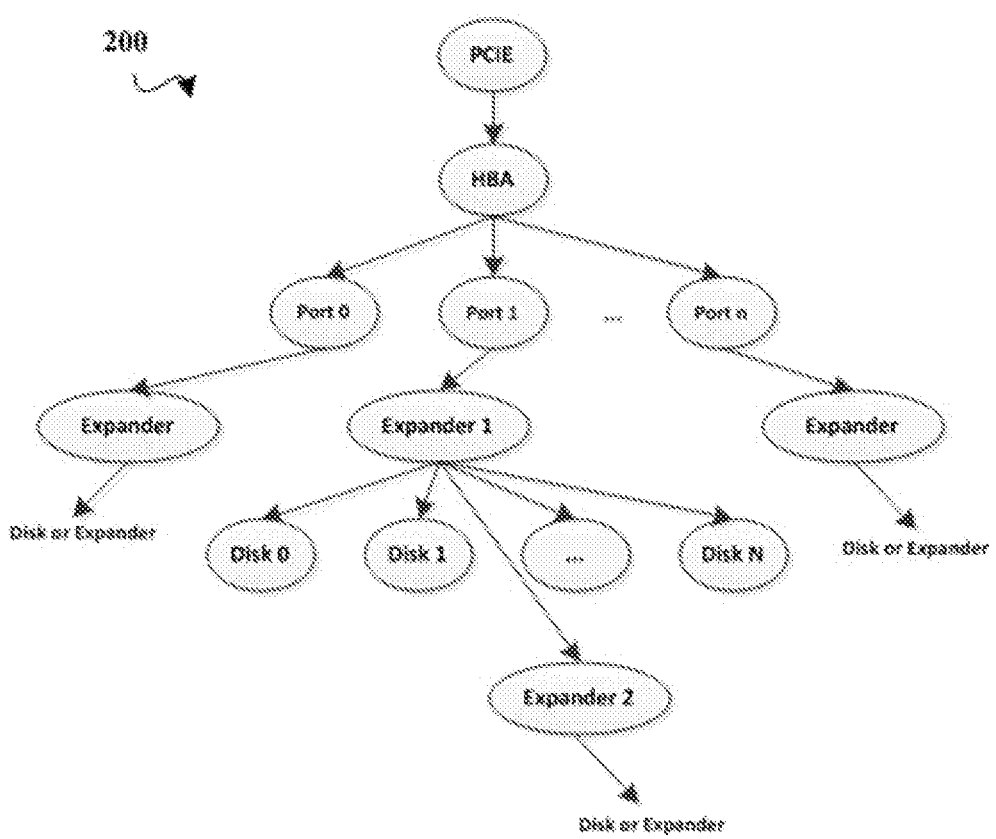
FIG. 2 illustrates a schematic architecture 200 of a storage device connected via a PCIe interface according to an exemplary embodiment of the present disclosure.

In one embodiment in step S201, in response to determining that a number of the errors in one or more hardware registers in a plurality of hardware registers exceed a predetermined threshold, performance of hardware devices corresponding to the one or more hardware registers may be detected. In an example embodiment, if a number of errors detected in a certain hardware register exceed a predetermined threshold, it may be an indication that a hardware device corresponding to a hardware register is experiencing performance deterioration, thus it may be necessary to perform further performance detection. In a further embodiment, performance detection may be performed only on hardware corresponding to a hardware register where a number of detected errors may have exceeded a predetermined threshold so as to reduce overheads. In an example embodiment, consider a PCIe device, FIG. 2 shows a schematic architecture of a storage device connected via a PCIe interface, while performing any I/O activity (e.g., read or write), the PCIe interface may be always involved, and if a PCIe error occurs in a PCIe interface of a specific host bus adapter HBA or in its upstream PCIe bridge/switch, then I/O of the HBA will be affected. In a further example embodiment, a single I/O may take more time to finish; and usage of HBA may increase, and an increase of I/O delay and HBA usage may undoubtedly affect performance of the system as a whole which may include parameters such as throughput, average I/O delay, etc.

In an example embodiment, performance detection may be performed by mans of a performance detector. In a further embodiment, a performance detector may be set based on types of hardware devices corresponding to a plurality of hardware registers. In an example embodiment, shown in FIG. 2, a performance detector of an HBA type may be used to detect a performance deterioration condition of a storage device where, for each kind of hard disk, its average I/O delay may be generally within a specific range (associated with the I/O size and mode). In a further embodiment, if a specific number of hard disks connected through a same HBA has a performance problem (e.g., the performance of 50% hard disks exceeds a predetermined threshold), it may be regarded as HBA performance deterioration.

In an additional embodiment, a network performance detector may be used to detect whether a network performance has deteriorated. In a further embodiment, similar to detection of a storage performance mentioned above, network performance may be evaluated considering a performance factor of a network stack itself and any other key parameters required for evaluation of network performance.

In a further embodiment, those skilled in the art would appreciate that a performance condition of a relevant device may be obtained by any other performance detection manner/means that may be well know or available, and embodiments of the disclosure are not limited to those means disclosed herein. In an additional embodiment, step S102 may also be performed by a monitoring module or a daemon.

In a further embodiment, in response to determining performance deterioration of one hardware device in the hardware devices corresponding to the one or more hardware registers, it may be determined that an error occurs in a particular hardware device. In this case, according to an alternative embodiment, this error may be reported to a monitoring module, while a monitoring module may associate this performance event with a detected hardware register error, and records the error in a log. In a further embodiment, automatic detection of errors occurring in a bus structure may be enabled, which, may result in saving cost, and may also result in enhancing error detection efficiency. A further embodiment may alternatively include a step of determining whether a backup device exists for an error hardware device. Yet a further embodiment may include an alternative step of in response to existence of a backup device, using a backup device to perform failover on an error hardware device.

In one embodiment, a relevant command for failover may be issued by a monitoring module or a daemon. In a specific embodiment, a failover mechanism may vary depending on different device types. In an alternate embodiment, simultaneously, an error hardware device may be reset. In an example embodiment, a monitoring module or a daemon may inform a bus driver and a device driver to suspend I/O, release configuration of the device, and then reset the device. According to an alternate embodiment, it may be determined whether to shift a backup device back to an error hardware device at least partially based on an error recovery history of the error hardware device. In an example embodiment, if a device is reset for the first time, it may be regarded that an error occurring is temporary, and might be recoverable. In a further embodiment, a device may be reconfigured and shifted back after being reset. In an alternate embodiment, if it is determined that error recovery is inappropriate based on an error recovery history of the device (e.g., performance of a device might still be instable after being reset), it may be notified to a user or administrator to record log and perform a subsequent action (e.g., changing the device) as required. In a further embodiment, it may be convenient to further handle errors after determining an error in a bus structure, which further improves availability and serviceability of a system, reduces cost, and enhances user experience.

Figure 3:
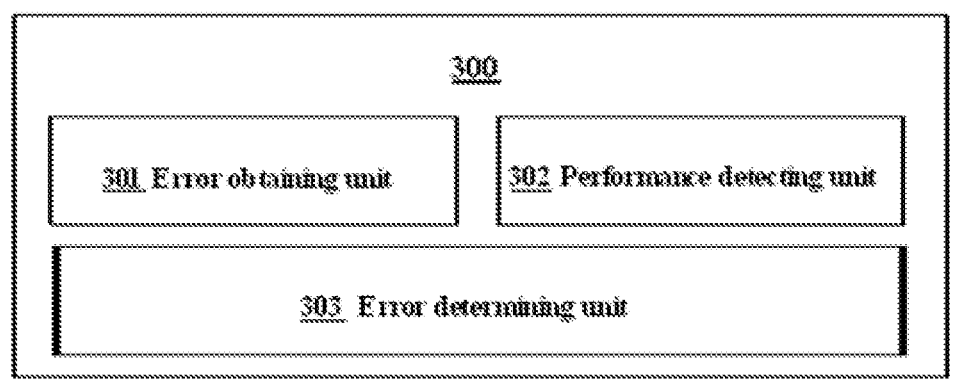
FIG. 3 illustrates a flow diagram of a system 300 for detecting and handling errors in a bus structure according to an exemplary embodiment of the present disclosure.

Reference is now made to FIG. 3, wherein a system 300 for detecting and handling errors in a bus structure according to an exemplary embodiment of the present disclosure will be described As shown in the figure, system 300 comprises error obtaining unit 301, performance detecting unit 302, and error determining unit 303, wherein error obtaining unit 301 is configured to obtain error information from a plurality of hardware registers associated with the bus. Performance detecting unit 302 is configured to, in response to determining that a number of the errors in one or more hardware registers of the plurality of hardware registers exceeds a predetermined threshold, detect performance issues of hardware devices corresponding to the one or more hardware registers. Error determining unit 303 is configured to, in response to determining performance deterioration of a particular hardware device in the hardware devices corresponding to the one or more hardware registers, determine that an error occurs in the particular hardware device.

In an alternative embodiment, system 300 may further include a backup device determining unit that may be configured to determine whether a backup device exists for the particular hardware. In a further embodiment, system 300 may include a failover unit that may be configured to, in response to the existence of a backup device, perform failover on a hardware device using the backup device. In an alternative embodiment, system 300 may include a resetting unit that may be configured to reset the particular hardware device. In an alternative embodiment, system 300 may include: a failover unit that may be configured to, after resetting the particular hardware device, decide whether to switch back to the particular hardware device from a backup device at least partially based on an error recovery history of the particular hardware device.

In an alternative embodiment, obtaining error information from a plurality of hardware registers associated with a bus may include periodically polling a plurality of hardware registers so as to obtain error information. In an alternative embodiment, periodicity for polling a plurality of hardware registers may be dynamically adjusted based on a number of errors. In an alternative embodiment obtaining error information from a plurality of hardware registers associated with a bus may include monitoring an interrupt message reporting error information from a hardware register, so as to obtain error information.

In an alternative embodiment, when a number of the errors is greater than a predetermined threshold, an interrupt message may be disabled. In yet an alternate embodiment, error information may be obtained by periodically polling a plurality of hardware registers. In an alternate embodiment, performance of hardware devices corresponding to the one or more hardware registers may be detected by a performance detector, and the performance detector being set based on types of hardware devices corresponding to a plurality of hardware registers.

Figure 4:
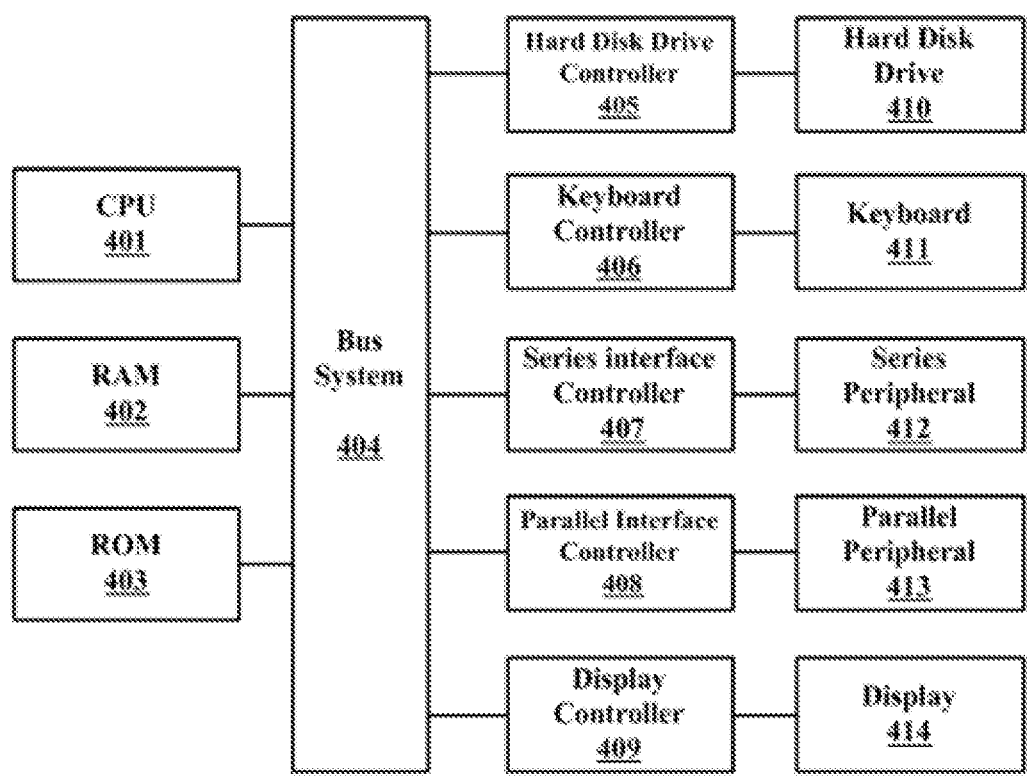
FIG. 4 illustrates a schematic block diagram of a computer system 400 adapted to implement the embodiments of the present disclosure.

Reference is now made to FIG. 4, in which a schematic block diagram of computer system 400 adapted for implementing the embodiments of the present disclosure is presented. For example, computer system 400 as shown in FIG. 4 may be used to implement various components of system 300 for detecting and handling errors in a bus structure as described above, or used for implementing or solidifying various steps of method 100 for detecting and handling errors in a bus structure as described above. In one embodiment, all individuals units/modules may be combined into a single module, wherein the single module may be configure to perform the tasks of individual modules in an orderly manner to obtain the desired results of each of the individual modules.

As shown in FIG. 4, the computer system may comprise: CPU (central processing unit) 401, RAM (random access memory) 402, ROM (read only memory) 403, system bus 404, hard disk controller 405, keyboard controller 406, serial interface controller 407, parallel interface controller 408, display controller 409, hard disk 410, keyboard 411, serial external device 412, parallel external device 413 and display 414. In these devices, what are coupled to system bus 404 include CPU 401, RAM 402, ROM 403, hard disk controller 405, keyboard controller 406, serial controller 407, parallel controller 408, and display controller 409. Hard disk 410 is coupled to hard disk controller 405, keyboard 411 is coupled to keyboard controller 406, serial external device 412 is coupled to serial interface controller 407, parallel external device 413 is coupled to parallel interface controller 408, and display 414 is coupled to display controller 409. It should be understood that the structural block diagram as shown in FIG. 4 is only illustrated for exemplary purposes, and should not be construed as a limitation for the scope of the present disclosure. In some cases, some devices may be added or reduced dependent on specific situations.

As mentioned above, system 300 may be implemented as pure hardware, e.g., chip, ASIC, SOC, etc. Such hardware may be integrated into computer system 400. Besides, embodiments of the present disclosure may also be implemented in a form of a computer program product. For example, method 100 described with reference to FIG. 1 may be implemented through a computer program product. The computer program product may be stored in RAM 402, ROM 403, hard disk 410 and/or any appropriate storage medium as shown in FIG. 4, or downloaded onto computer system 400 from an appropriate location through the network. The computer program product may include a computer code section including program instructions that may be performed by an appropriate processing device (e.g., CPU 401 shown in FIG. 4). The computer program instruction at least may include instructions for implementing the steps of method 100. These instructions, for example, include: an instruction for obtaining error information from a plurality of hardware registers associated with a bus; an instruction for, in response to determining that a number of errors in one or more hardware registers of a plurality of hardware registers exceeds a predetermined threshold, detecting performance issues of hardware devices corresponding to the one or more hardware registers; and an instruction, for in response to determining performance deterioration of a particular hardware device in the hardware devices corresponding to the one or more hardware registers, determining that an error occurs in the particular hardware device.

The spirit and principle of the present invention has been illustrated in conjunction with several preferred embodiments. The method and system for detecting and handling error in a bus structure according to the present disclosure has many advantages over the prior art. For example, the method and system as provided in the disclosure enable automatic detection of errors occurring in a bus structure, which saves costs and enhances error detection efficiency.

Besides, through the embodiments provided by the present disclosure, it may be convenient to further handle an error after determining an error in a bus structure, which further improves availability and serviceability of a system, reduces cost, and enhances user experience.

It should be noted that the embodiments may be implemented through hardware, software or a combination of software and hardware. The hardware section may be implemented using a specific logic; the software part may be stored in a memory and executed by an appropriate instruction executing system, e.g., a microprocessor or specifically designed hardware. A person of normal skill in the art may understand that the above device and method may be implemented using a computer executable instruction and/or included in processor controlled code, e.g., a carrier medium such as a magnetic disk, a CD or a DVD-ROM, a programmable memory such as a read-only memory (firmware) or a data carrier such as an electronic signal carrier. The apparatus and its modules of the present disclosure may be implemented by a semiconductor such as a very large scale integrated circuit or gate array, a semiconductor such as a logic chip, a transistor, etc., or a hardware circuit of a programmable hardware device such as a field programmable gate array, a programmable logic device, etc., or implemented by software executed by various types of processors, or implemented by a combination of the above hardware circuits and software, e.g., firmware.

It should be noted that although several modules or sub-modules of the apparatus have been described in detail above, such partition is not mandatory. Actually, according to embodiments of the present disclosure, the features and functions of two or more modules as described above may be embodied into a single module. In turn, features and functions of a single module as described above may be further partitioned into a plurality of modules to be embodied. Additionally, although the operations of the method according to the present disclosure have been described in a specific order in the drawings, this does not require or imply that these operations must be executed in the specific order, or a desired outcome can only be achieved by executing all of the shown operations. Instead, the steps described in the flow diagrams may be executed in a different order. Additionally or alternatively, some steps may be omitted; a plurality of steps may be merged into one step to execute, and/or a step may be decomposed into a plurality of steps for execution.

Although the present disclosure has been described with reference to several preferred embodiments, it should be understood that the present disclosure is not limited to the preferred embodiments as disclosed. The present disclosure intends to cover various modifications and equivalent arrangements included within the spirit and scope of the appended claims. The scope of the appended claims satisfies a broadest explanation, thereby including all of such modifications and equivalent structures and functions.

What is claimed is:

1. A method for detecting and handling errors in a bus structure, the method comprising:
   determining a location of an error in the bus structure by obtaining error information from a plurality of hardware registers associated with a bus;
   determining whether an amount of errors in one or more hardware registers of the plurality of hardware registers exceeds a predetermined threshold;
   monitoring an interrupt message reporting the error information from the one or more hardware registers to obtain the error information;
   disabling the interrupt message when the amount of errors in the one or more hardware registers exceeds the predetermined threshold;
   detecting a performance deterioration of a hardware device among a plurality of hardware devices corresponding to the one or more hardware registers;
   in response to determining the performance deterioration of the hardware device, inferring that an error occurs in the hardware device;
   determining whether a backup device exists for the hardware device;
   in response to determining existence of the backup device, performing a failover on the hardware device using the backup device;
   resetting the hardware device; and
   after resetting the hardware device, deciding whether to switch back to the hardware device from the backup device at least partially based on an error recovery history of the hardware device, wherein the error recovery history of the hardware device is indicative of the error in the bus structure being temporary if the hardware device is reset for a first time.

2. The method according to claim 1, wherein obtaining error information from a plurality of hardware registers associated with a bus comprises: periodically polling the plurality of hardware registers to obtain the error information.

3. The method according to claim 2, further comprises dynamically adjusting a periodicity for periodically polling the plurality of hardware registers based on the amount of errors in one or more hardware registers of the plurality of hardware registers.

4. The method according to claim 1, wherein when the interrupt message is disabled, obtaining the error information by periodically polling the plurality of hardware registers.

5. The method according to claim 1, wherein the performance of hardware devices corresponding to the one or more hardware registers is detected by a performance detector, the performance detector being set based on types of the hardware devices corresponding to the plurality of hardware registers.

6. The method according to claim 1, wherein the bus is a PCIe bus.

7. A system for detecting and handling errors in a bus structure, the system configure to perform operations comprising:
   determining a location of an error in the bus structure by obtaining error information from a plurality of hardware registers associated with a bus;
   determining whether an amount of errors in one or more hardware registers of the plurality of hardware registers exceeds a predetermined threshold;
   monitoring an interrupt message reporting the error information from the one or more hardware registers to obtain the error information;
   disabling the interrupt message when the amount of errors in the one or more hardware registers exceeds the predetermined threshold;
   detecting a performance deterioration of a hardware device among a plurality of hardware devices corresponding to the one or more hardware registers;
   in response to determining performance deterioration of the hardware device, inferring that an error occurs in the hardware device;
   determining whether a backup device exists for the hardware device;

in response to determining existence of the backup device, performing a failover on the hardware device using the backup device;

resetting the hardware device; and after resetting the hardware device, deciding whether to switch back to the hardware device from the backup device at least partially based on an error recovery history of the hardware device, wherein the error recovery history of the hardware device is indicative of the error in the bus structure being temporary if the hardware device is reset for a first time.

8. The system according to claim 7, wherein obtaining error information from a plurality of hardware registers associated with a bus comprises:

periodically polling the plurality of hardware registers to obtain the error information; and dynamically adjusting a periodicity for periodically polling the plurality of hardware registers based on the amount of errors in one or more hardware registers of the plurality of hardware registers.

9. The system according to claim 7, when the interrupt message is disabled obtaining the error information by periodically polling the plurality of hardware registers.

10. The system according to claim 7, wherein the bus is a PCIe bus.

11. A computer program product comprising:

a non-transitory computer readable medium encoded with computer executable program code, wherein the code enables execution across one or more processors for detecting and handling errors in a bus structure, comprising:

determining a location of an error in the bus structure by obtaining error information from a plurality of hardware registers associated with a bus by performing at least one of:

periodically polling the plurality of hardware registers to obtain the error information by dynamically adjusting a periodicity for periodically polling the plurality of hardware registers based on the amount of errors in one or more hardware registers of the plurality of hardware registers; and monitoring an interrupt message reporting the error information from the one or more hardware registers to obtain the error information, wherein when the amount of errors is greater than a predetermined threshold, disabling the interrupt message; and wherein the error information is obtained by periodically polling the plurality of hardware registers when the amount of errors is greater than a predetermined threshold;

determining whether the amount of errors in the one or more hardware registers exceeds the predetermined threshold;

detecting a performance deterioration of a hardware device among a plurality of hardware devices corresponding to the one or more hardware registers;

in response to determining the performance deterioration of the hardware device, inferring that an error occurs in the hardware device;

determining whether a backup device exists for the hardware device;

in response to determining existence of the backup device, performing a failover on the hardware device using the backup device;

resetting the hardware device; and after resetting the hardware device, deciding whether to switch back to the hardware device from the backup device at least partially based on an error recovery history of the hardware device, wherein the error recovery history of the hardware device is indicative of the error in the bus structure being temporary if the hardware device is reset for a first time.

12. The computer program product according to claim 11, wherein the performance of hardware devices corresponding to the one or more hardware registers is detected by a performance detector, the performance detector being set based on types of the hardware devices corresponding to the plurality of hardware registers.

* * * * *